US011731276B2

(12) United States Patent
Kobayashi

(10) Patent No.: US 11,731,276 B2
(45) Date of Patent: Aug. 22, 2023

(54) ROBOT SYSTEM AND CONTROL METHOD FOR ROBOT

(71) Applicant: Seiko Epson Corporation, Tokyo (JP)

(72) Inventor: Masakazu Kobayashi, Shiojiri (JP)

(73) Assignee: SEIKO EPSON CORPORATION

( * ) Notice: Subject to any disclaimer, the term of this patent is extended or adjusted under 35 U.S.C. 154(b) by 192 days.

(21) Appl. No.: 17/235,978

(22) Filed: Apr. 21, 2021

(65) Prior Publication Data

US 2021/0331319 A1  Oct. 28, 2021

(30) Foreign Application Priority Data

Apr. 22, 2020  (JP) .............................. JP2020-075863

(51) Int. Cl.
  *B25J 9/16* (2006.01)
  *B25J 19/00* (2006.01)
  *B25J 19/02* (2006.01)

(52) U.S. Cl.
  CPC ............. *B25J 9/1674* (2013.01); *B25J 9/163* (2013.01); *B25J 19/0075* (2013.01); *B25J 19/02* (2013.01)

(58) Field of Classification Search
  CPC ...... B25J 9/1674; B25J 9/163; B25J 19/0075; B25J 19/02; B25J 9/1602; B25J 9/02; B25J 19/00; B25J 9/0009; B25J 9/08; B25J 9/101; B25J 9/1653; B25J 9/1656; B25J 9/1664; B25J 13/08; B25J 19/06; G05B 2219/40199; G05B 19/406; G05B 2219/49144; G05B 2219/23211; G05B 2219/23395; G05B 2219/35473; G05B 2219/40371

See application file for complete search history.

(56) References Cited

U.S. PATENT DOCUMENTS

| | | | |
|---|---|---|---|
| 6,116,670 A * | 9/2000 | Palone | B25J 15/02 |
| | | | 414/758 |
| 2012/0067157 A1 | 3/2012 | Suzuki et al. | |
| 2014/0013893 A1 * | 1/2014 | Asano | B25J 18/00 |
| | | | 901/27 |
| 2021/0268646 A1 * | 9/2021 | Wakana | B25J 19/023 |
| 2022/0203563 A1 * | 6/2022 | Wuensch | B25J 9/1674 |

FOREIGN PATENT DOCUMENTS

| | | |
|---|---|---|
| JP | H03-281190 A | 12/1991 |
| JP | 2012-61565 A | 3/2012 |
| JP | 2014-46443 A | 3/2014 |

* cited by examiner

*Primary Examiner* — Ian Jen
*Assistant Examiner* — Esvinder Singh
(74) *Attorney, Agent, or Firm* — Harness, Dickey & Pierce, P.L.C.

(57) ABSTRACT

An arm of a robot is configured to which an arm cover for covering a wire or a pipe placed outside of the arm is attachable. An input reception unit receives first input indicating attachment of the arm cover to the arm. A movable range determination unit determines a movable range of the robot to be a second movable range smaller than a first movable range without the attachment of the arm cover according to the first input. A robot control unit controls an operation of the robot according to the second movable range.

5 Claims, 6 Drawing Sheets

*FIG. 3*

ROBOT SYSTEM AND CONTROL METHOD FOR ROBOT

The present application is based on, and claims priority from JP Application Serial Number 2020-075863, filed Apr. 22, 2020, the disclosure of which is hereby incorporated by reference herein in its entirety.

BACKGROUND

1. Technical Field

The present disclosure relates to a robot system and a control method for a robot.

2. Related Art

A wire or a pipe may be coupled to a hand unit of a robot for a mechanism of the hand unit. The wire or pipe is often externally attached to an arm. JP-A-2014-46443 discloses a technique of holding the wire or pipe on the arm using a cable support frame. When the wire or pipe is held on the arm using the cable support frame, a posture of the wire or pipe may change depending on a posture of the robot, a defect that a cable contacts a peripheral device may be caused.

However, in the technique of JP-A-2014-46443, work of repeating trial and error for adjustment of a movable range of the arm is necessary.

SUMMARY

According to a first aspect of the present disclosure, a robot system is provided. The robot system includes a robot having an arm configured to which an arm cover for covering a wire or a pipe placed outside of the arm is attachable, an input reception unit that receives first input indicating attachment of the arm cover to the arm, a movable range determination unit that determines a movable range of the robot to be a second movable range smaller than a first movable range without attachment of the arm cover according to the first input, and a robot control unit that controls an operation of the robot according to the second movable range.

According to a second aspect of the present disclosure, a control method for a robot configured to which an arm cover for covering a wire or a pipe placed outside of an arm is attachable is provided. The control method includes (a) receiving first input indicating attachment of the arm cover to the arm, (b) determining a movable range of the robot to be a second movable range smaller than a first movable range without the attachment of the arm cover according to the first input, and (c) controlling an operation of the robot according to the second movable range.

BRIEF DESCRIPTION OF THE DRAWINGS

FIG. 3 is an explanatory diagram showing an example of a window for inputting attachment of an arm cover.

DESCRIPTION OF EXEMPLARY EMBODIMENTS

A. First Embodiment

Figure 1:
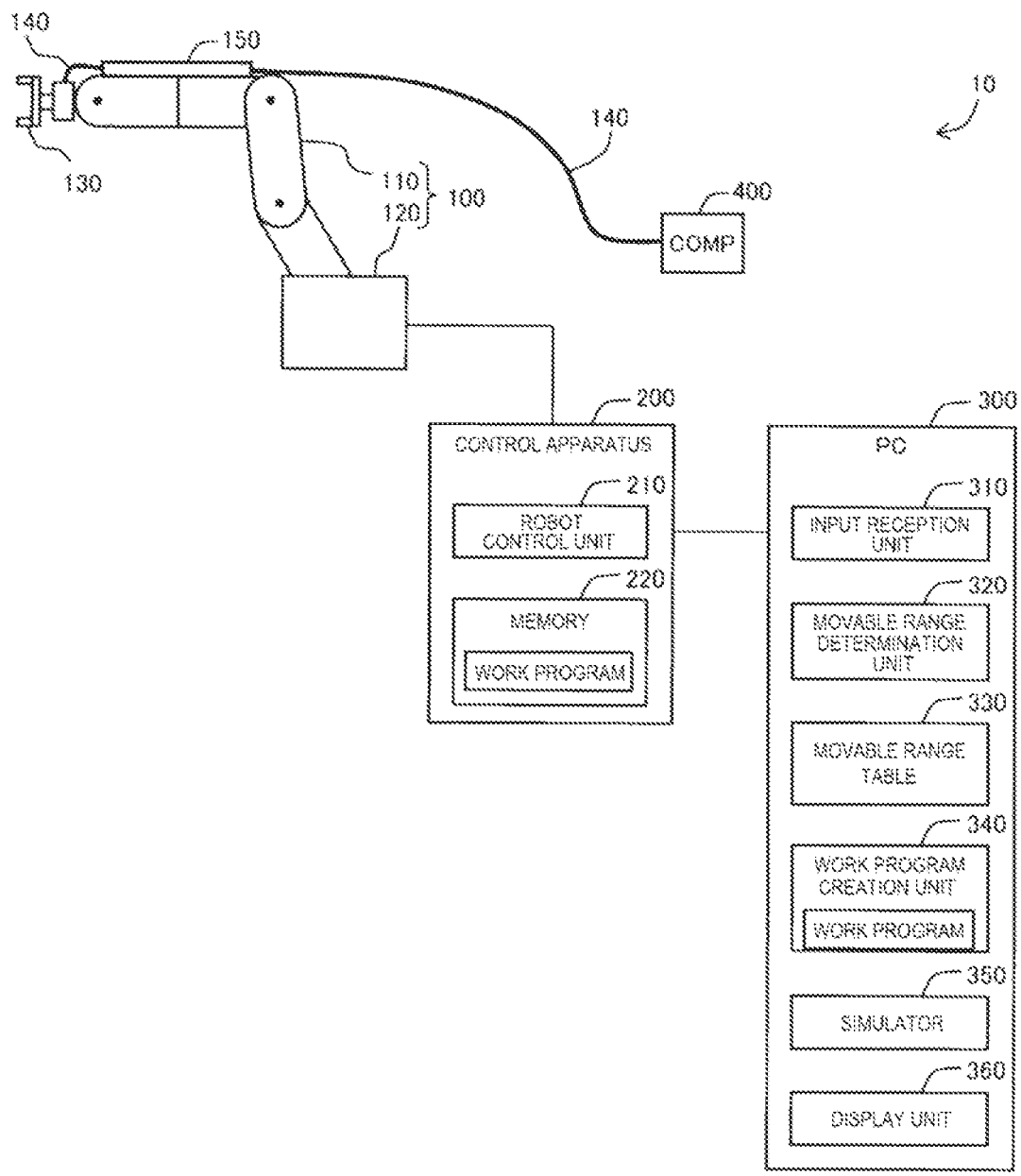
FIG. 1 is a conceptual diagram of a robot system of a first embodiment.

FIG. 1 is a conceptual diagram of a robot system 10 of a first embodiment of the present disclosure. The robot system 10 includes a robot 100, a control apparatus 200, and a personal computer 300.

The robot 100 includes an arm 110 and a base 120. An end effector 130 such as a hand is attached to a distal end portion of the arm 110. The distal end portion of the arm 110 and the end effector 130 is also collectively referred to as "hand unit". In this example, the robot 100 is a vertical articulated robot having six axes. Note that the robot 100 may be a horizontal articulated robot, or a robot having at least one axis can be used.

An auxiliary device 400 for end effector is coupled to the end effector 130 via a coupling line 140. In this example, the auxiliary device 400 is a compressor and the coupling line 140 is an air pipe. As a combination of the end effector 130 and the auxiliary device 400, various other combinations than the example can be used. In this case, the coupling line 140 including a flexible wire or pipe suitable for the configuration of the end effector 130 is used. In the present disclosure, "wire or pipe" is used in a broad sense including a configuration containing only a wire, a configuration containing only a pipe, and a configuration containing a wire and a pipe. The coupling line 140 may be coupled to an accessory device such as a camera or a sensor provided in the distal end portion of the arm 110. In this case, an auxiliary device suitable for the accessory device is used.

An arm cover 150 for covering the coupling line 140 placed outside of the arm 110 can be attached to the arm 110 of the robot 100. The arm cover 150 is attached, and thereby, the wire or pipe of the coupling line 140 may be prevented from contacting a peripheral device placed around the robot 100. In the example of FIG. 1, the arm cover 150 has a plate shape or a box shape and is formed using resin or metal. Note that a bag-shaped cover may be used as the arm cover 150.

The control apparatus 200 includes a robot control unit 210 and a memory 220. In the memory 220, a work program for the robot 100 is stored in advance. The robot control unit 210 executes control of the robot 100 according to the work program.

The personal computer 300 has an input reception unit 310, a movable range determination unit 320, a movable range table 330, a work program creation unit 340, a simulator 350, and a display unit 360. The input reception unit 310 receives input indicating attachment of the arm cover 150 to the arm 110. In the embodiment, the input is performed by a user and a specific example thereof will be described later. The movable range determination unit 320 has a function of determining a movable range of the robot 100 to be a second movable range smaller than a first movable range without the attachment of the arm cover 150 according to the input received by the input reception unit 310. The first movable range and the second movable range are registered in the movable range table 330 in advance. The work program creation unit 340 executes generation and correction of the work program for the robot 100 according to an instruction by the user. The created work program is also transmitted to the control apparatus 200. The simulator 350 has a function of simulating an operation of the robot 100 using the work program and checking whether or not a defect is caused in the work program. In this regard, the simulator 350 executes a simulation using the movable range determined by the movable range determination unit 320.

Figure 2:
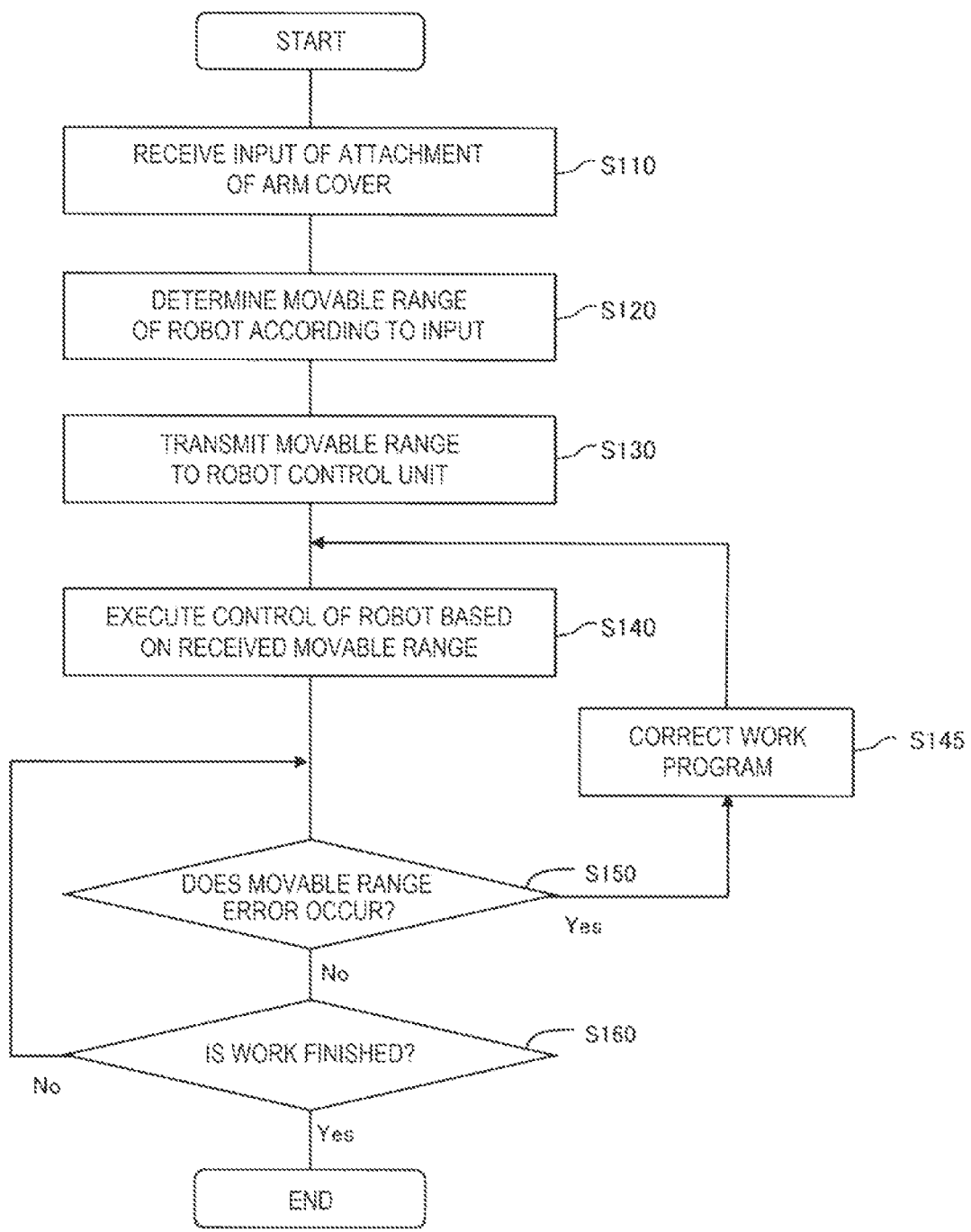
FIG. 2 is a flowchart showing an operation of the robot system in the first embodiment.

FIG. 2 is a flowchart showing an operation of the robot system 10 in the first embodiment. Processing in FIG. 2 is executed by the control apparatus 200 and the personal computer 300. At step S110, the user performs input indicating the attachment of the arm cover 150 to the arm 110 using the personal computer 300 and the input reception unit 310 receives the input. At step S120, the movable range determination unit 320 determines the movable range of the robot 100 according to the input received by the input reception unit 310.

Figure 3:
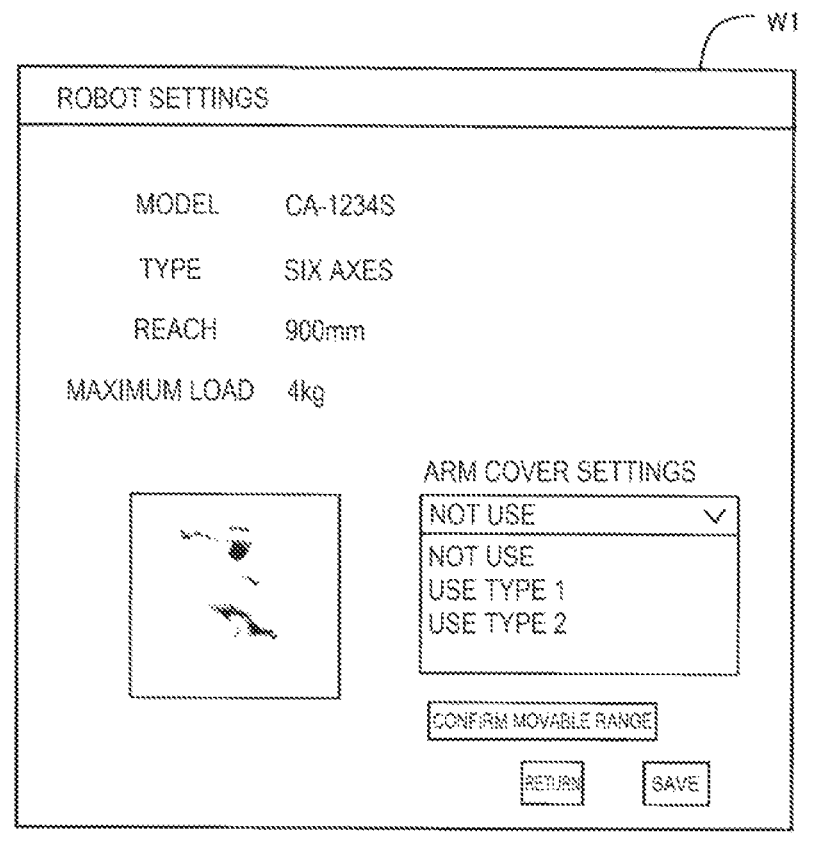

FIG. 3 is an explanatory diagram showing an example of a window W1 for inputting attachment of the arm cover 150. The window W1 is a window showing various settings of the robot 100, in which the model name, the number of axes, reach, the maximum load, etc. of the robot 100 are displayed. Further, as arm cover settings, a plurality of choices including "Not Use", "Use Type 1", and "Use Type 2" are selectably displayed as a pulldown menu. "Type 1" and "Type 2" refer to different types of the arm cover 150. When a choice for using the arm cover 150 such as "Use Type 1" or "Use Type 2" is selected, the input is received by the input reception unit 310. Note that, in place of the pulldown menu, a checkbox showing "Use Arm Cover" and checkboxes showing "Use Type 1" and "Use Type 2" may be used. When a "Confirm Movable Range" button within the window W1 is pressed, the movable range determined according to the arm cover setting can be confirmed.

Figures 4, 5:
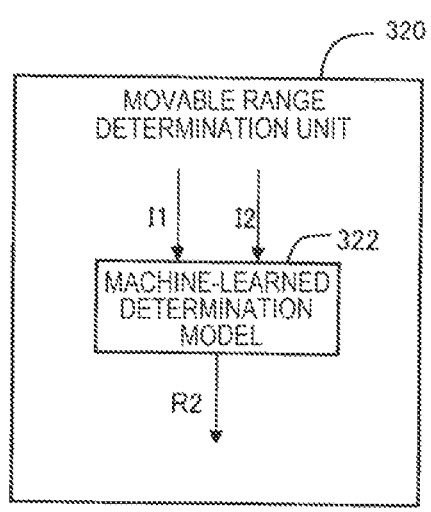
FIG. 4 is an explanatory diagram showing an example of a window for confirmation of movable ranges.
FIG. 5 is a block diagram of a movable range determination unit having a machine-learned determination model.

FIG. 4 is an explanatory diagram showing an example of a window W2 for confirmation of movable ranges. In this example, a standard first movable range R1 when the arm cover 150 is not used and a second movable range R2 when the arm cover 150 of Type 1 is used are shown. These movable ranges R1, R2 are determined as ranges that can be taken by the six axes of the robot 100. The second movable range R2 is smaller than the first movable range R1. In this example, in the second movable range R2, ranges of a third axis J3 and a fourth axis J4 are determined to be smaller than those of the first movable range R1. These movable ranges R1, R2 are registered in the movable range table 330 in advance.

Note that, when only one type of the arm cover 150 is attachable to the arm 110, the second movable range R2 suitable for the arm cover 150 is registered in the movable range table 330 in advance. Or, when the arm 110 is configured to which a plurality of types of the arm covers 150 are attachable, the second movable ranges R2 respectively suitable for the plurality of types of the arm covers 150 are registered in the movable range table 330 in advance. As shown in FIG. 3, the input reception unit 310 receives input for a distinction of the attached arm cover 150 among the plurality of types of the arm covers 150. The movable range determination unit 320 selects one of the plurality of second movable ranges R2 according to the input received by the input reception unit 310. According to the configuration, settings of the movable range of the robot 100 may be easily executed according to the types of the arm cover 150. It is not necessary to calculate the second movable range R2 according to the type of the arm cover 150 at each time and the appropriate second movable range R2 may be easily determined. Note that the movable range table 330 can be regarded as a part of the movable range determination unit 320. Or, as the movable range determination unit 320, a unit using machine learning, which will be described later, can be used.

FIG. 5 is a block diagram showing a configuration of the movable range determination unit 320 using machine learning. The movable range determination unit 320 has a machine-learned determination model 322. The determination model 322 outputs the movable range R2 of the robot 100 suitable for the arm cover 150 according to first input I1 indicating attachment of the arm cover 150 and second input I2 having an influence on the movable range of the robot 100. The determination model 322 can be formed as e.g. a neural network. The first input I1 is input by the above described arm cover setting explained in FIG. 3. The second input I2 is different from the first input I1 and, e.g. data representing the dimensions of the arm cover 150 and an image of the arm cover 150 may be used as the second input I2. Or, in consideration of a case where a bag-shaped cover is used as the arm cover 150, the material of the arm cover 150 may be used as the second input I2. The input reception unit 310 receives and transmits these two pieces of input I1, I2 to the movable range determination unit 320. The movable range determination unit 320 can determine the second movable range R2 from the first input I1 and the second input I2 using the machine-learned determination model 322. According to the configuration, the movable range of the robot 100 may be appropriately determined in consideration of the second input I2 having the influence on the movable range as well. Note that the movable range determination unit 320 may determine the second movable range R2 using only the first input I1 without using the determination model 322.

At step S130 in FIG. 2, the movable range determined at step S120 is transmitted from the personal computer 300 to the robot control unit 210 of the control apparatus 200. At step S140, the robot control unit 210 executes control of the robot 100 according to the work program based on the movable range received at step S130. At step S150, whether or not an out-of-movable-range error that an operation according to the work program is out of the movable range occurs is determined during execution of the control of the robot 100. When the out-of-movable-range error occurs, the robot control unit 210 stops the control according to the work program and transmits an occurrence of the out-of-movable-range error to the personal computer 300 to inform the user. At step S145, the user corrects the work program using the work program creation unit 340. The corrected work program is transmitted to the control apparatus 200 and the process returns to step S140. In this manner, steps S140 to S150 are repeatedly executed until the out-of-movable-range error no longer occurs. When the work is finished at step S160, the entire processing is ended.

As described above, in the first embodiment, the coupling line 140 including the wire or pipe is covered by the arm cover 150, and the coupling line 140 may be prevented from contacting a peripheral device. Further, when the arm cover 150 is attached to the arm 110, the movable range of the robot 100 is determined to be the smaller second movable range R2, and thereby, settings for preventing interferences between the arm cover 150 and peripheral devices may be easily executed. Furthermore, interferences of the robot 100 itself with the arm cover 150 may be also prevented.

B. Second Embodiment

Figure 6:
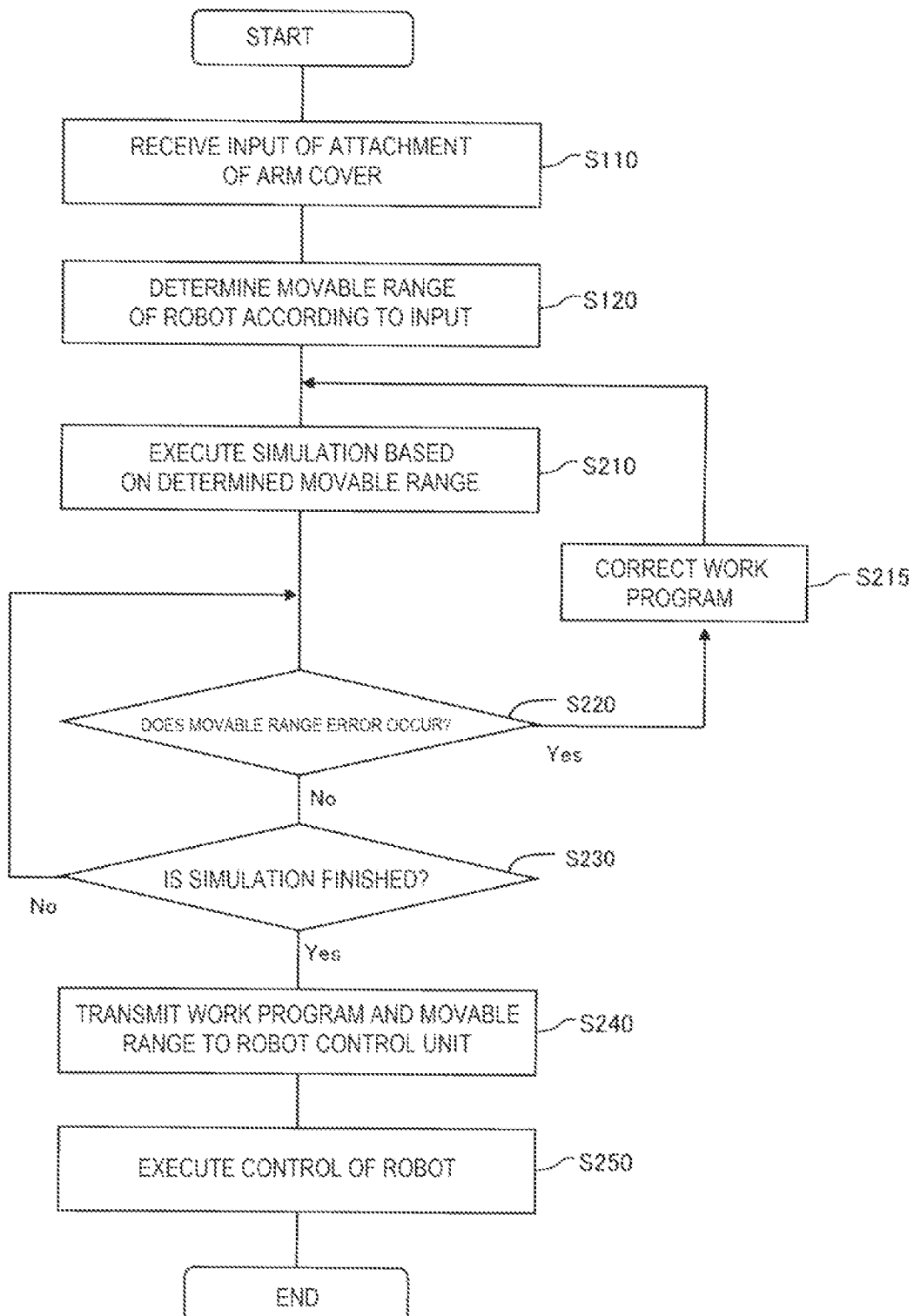
FIG. 6 is a flowchart showing an operation of a robot system in a second embodiment.

FIG. 6 is a flowchart showing an operation of the robot system 10 in a second embodiment. The configuration of the robot system 10 of the second embodiment is the same as that of the first embodiment, and a part of the operation shown in FIG. 6 is different from that in FIG. 2. Specifically, steps S110, S120 in FIG. 6 are the same as the steps S110, S120 in FIG. 2, and the processing at step S130 and the subsequent steps in FIG. 2 is changed to processing at step S210 and the subsequent steps in FIG. 6.

At step S210, the simulator 350 executes a simulation of the operation of the robot 100 according to the work program based on the movable range determined at step S120. At step S220, whether or not an out-of-movable-range error that the operation according to the work program is out of the movable range occurs is determined during execution of the simulation. When the out-of-movable-range error occurs, the simulator 350 stops the simulation according to the work program and informs the user of the occurrence of the out-of-movable-range error. At step S215, the user corrects the work program using the work program creation unit 340 and the process returns to step S210. In this manner, steps S210 and S220 are repeatedly executed until the out-of-movable-range error no longer occurs and, when the simulation is finished at step S230, the process moves to step S240. At step S240, the final work program and movable range are transmitted from the personal computer 300 to the robot control unit 210 of the control apparatus 200. At step S250, the control of the robot is executed by the robot control unit 210.

The above described second embodiment exerts the same effects as those of the first embodiment. Further, the second embodiment has an advantage that whether or not a defect is caused in the movable range and the work program may be determined by the simulator 350 without actual operation of the robot 100.

C. Third Embodiment

Figure 7:
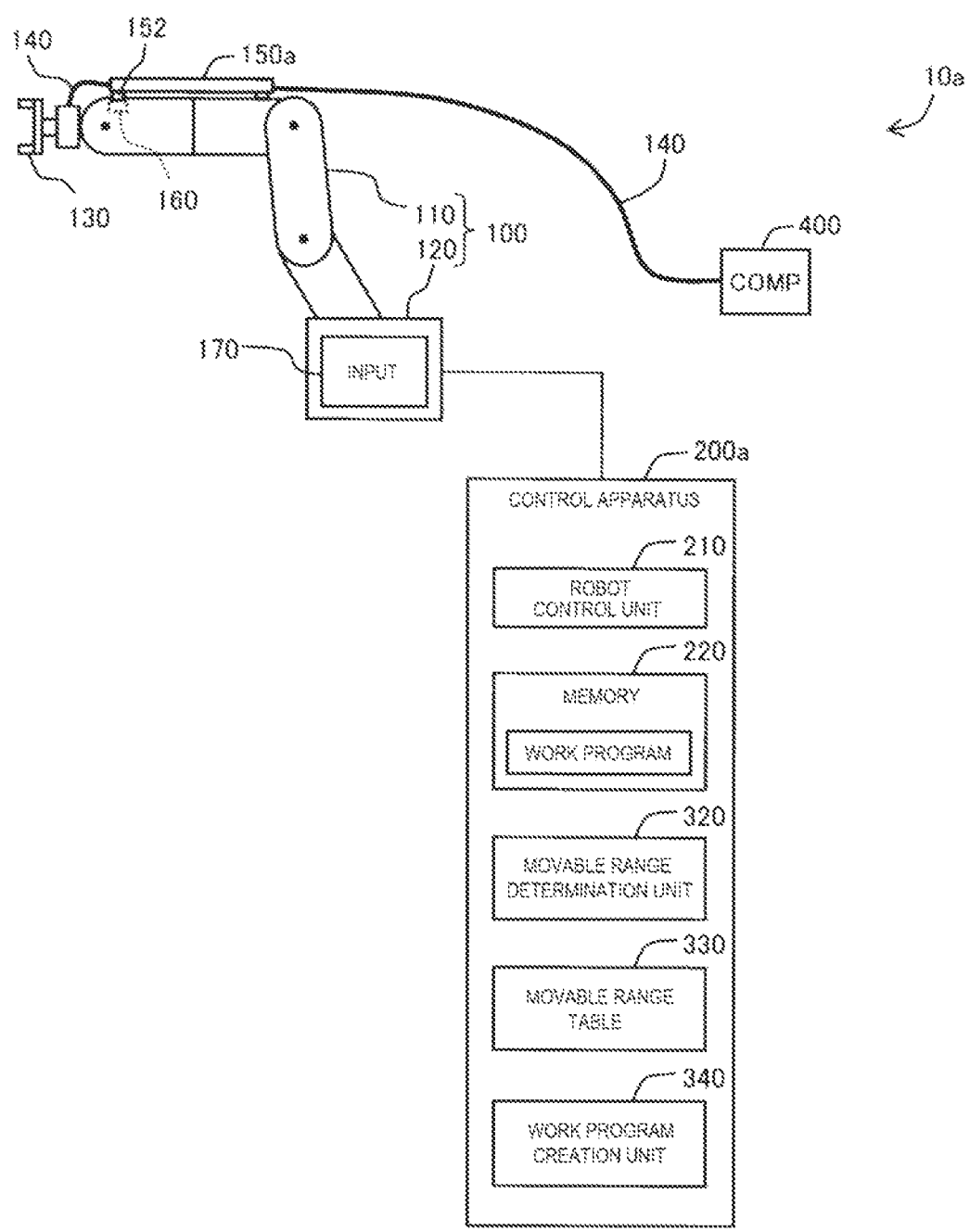
FIG. 7 is a conceptual diagram of a robot system of a third embodiment.

FIG. 7 is a conceptual diagram of a robot system 10a of a third embodiment. The robot system 10a is different from that of the first embodiment in the configuration of an arm cover 150a and in that the personal computer 300 is omitted and a part of the function thereof is realized by a control apparatus 200a. The rest of the configuration is the same as that of the robot system 10 of the first embodiment.

The arm cover 150a has a protrusion 152 as an engagement member that engages with the arm 110 of the robot 100. The arm 110 has a sensor 160 that senses attachment of the arm cover 150a. The sensor 160 is e.g. a sensor that detects engagement of the protrusion 152 of the arm cover 150a with an engagement portion of the arm 110. Specifically, for example, one or more electric contacts are respectively provided on the protrusion 152 and the sensor 160, and thereby, the attachment state of the arm cover 150a can be detected according to the contact states of those electric contacts. When a plurality of types of the arm covers 150a can be used, the electric contacts of the arm covers 150a may be placed in different positions according to the types. Note that, as the sensor 160, other various sensors can be used.

An input reception unit 170 is provided in the base 120 of the robot 100. The input reception unit 170 informs the control apparatus 200a of the attachment state of the arm cover 150a sensed by the sensor 160. That is, the input reception unit 170 receives the detection result of the sensor 160 as input indicating the attachment of the arm cover. According to the configuration, the input indicating the attachment of the arm cover 150a may be provided to the input reception unit 170 without execution of input by the user.

The control apparatus 200a has the movable range determination unit 320, the movable range table 330, and the work program creation unit 340 in addition to the robot control unit 210 and the memory 220. These respective units 320 to 340 are realized by the personal computer 300 in the first embodiment and the functions and the operations thereof are substantially the same as the functions and the operations of these respective units 320 to 340 in the first embodiment and the explanation thereof will be omitted. In the embodiment, for example, when the arm cover 150a is changed to another type of arm cover after teaching work, the same effects as those of the first embodiment may be exerted. Or, when the arm cover 150a is once detached, and then, attached again by maintenance work or the like, the same effects as those of the first embodiment may be exerted. Note that, even when teaching work is not finished, the same effects as those of the first embodiment may be exerted. Here, a simulation can be performed by preparation of a personal computer or a control apparatus having a function of a simulator.

Further, the third embodiment has an advantage that it is unnecessary for the user to provide input indicating the attachment of the arm cover 150a.

Other Embodiments

The present disclosure is not limited to the above described embodiments, but may be realized in various aspects without departing from the scope thereof. For example, the present disclosure can be realized in the following aspects. The technical features in the above described embodiments corresponding to technical features in the following respective aspects can be appropriately replaced or combined for solving part or all of the problems of the present disclosure or achieving part or all of the effects of the present disclosure. Further, the technical features can be appropriately deleted unless the technical features are described as essential features in this specification.

(1) According to a first aspect of the present disclosure, a robot system is provided. The robot system includes a robot having an arm configured to which an arm cover for covering a wire or a pipe placed outside of the arm is attachable, an input reception unit that receives first input indicating attachment of the arm cover to the arm, a movable range determination unit that determines a movable range of the robot to be a second movable range smaller than a first movable range without the attachment of the arm cover according to the first input, and a robot control unit that controls an operation of the robot according to the second movable range.

According to the robot system, the wire or pipe is covered by the arm cover, and the wire or pipe may be prevented from contacting a peripheral device. Further, when the arm cover is attached to the arm, the movable range of the robot is determined to be the smaller second movable range, and thereby, settings for preventing interferences between the arm cover and peripheral devices may be easily executed. Furthermore, interferences of the robot with the arm cover may be prevented.

(2) In the above described robot system, the arm may be configured to which a plurality of types of arm covers are attachable as the arm cover, the first input may be input for a distinction of the attached arm cover among the plurality of types of arm covers, and a plurality of the second movable ranges corresponding to the plurality of types of arm covers may be registered in the movable range determination unit in advance, and one of the plurality of the second movable ranges may be selected according to the first input.

According to the robot system, when a plurality of types of the arm covers are attachable to the arm, settings of the movable range of the robot may be easily executed according to the types of the arm cover. Further, it is not necessary to calculate the movable range according to the type of the arm cover at each time and the appropriate movable range may be easily set.

(3) In the above described robot system, the input reception unit may be configured to receive second input having an influence on the movable range of the robot in addition to the first input, and the movable range determination unit may determine the second movable range from the first input and the second input using a machine-learned determination model.

According to the robot system, the movable range of the robot may be appropriately determined in consideration of the second input having the influence on the movable range as well.

(4) In the above described robot system, the input reception unit may be realized by a personal computer and the first input is executed by a user.

According to the robot system, settings according to the arm cover may be reliably executed. Further, the configuration of the robot itself may be simplified.

(5) In the above described robot system, the arm may have a sensor that senses attachment of the arm cover, and the input reception unit may receive a detection result of the sensor as the first input.

According to the robot system, the first input indicating the attachment of the arm cover may be provided to the input reception unit without execution of the first input by the user.

According to a second aspect of the present disclosure, a control method for a robot configured to which an arm cover for covering a wire or a pipe placed outside of an arm is attachable is provided. The control method includes (a) receiving first input indicating attachment of the arm cover to the arm, (b) determining a movable range of the robot to be a second movable range smaller than a first movable range without the attachment of the arm cover according to the first input, and (c) controlling an operation of the robot according to the second movable range.

According to the control method, the wire or pipe is covered by the arm cover, and the wire or pipe may be prevented from contacting a peripheral device. Further, when the arm cover is attached to the arm, the movable range of the robot is determined to be the smaller second movable range, and thereby, settings for preventing interferences between the arm cover and peripheral devices may be easily executed. Furthermore, interferences of the robot with the arm cover may be prevented.

What is claimed is:

1. A robot system comprising:
a robot having an arm configured to which an arm cover for covering a wire or a pipe placed outside of the arm is attachable;
an input reception unit that receives first input indicating attachment of the arm cover to the arm;
a movable range determination unit that determines a movable range of the robot to be a second movable range smaller than a first movable range without the attachment of the arm cover according to the first input; and
a robot control unit that controls an operation of the robot according to the second movable range, wherein
the arm is configured to which a plurality of types of arm covers are attachable as the arm cover,
the first input is input for a distinction of the attracted arm cover among the plurality of types of arm covers, and
a plurality of the second movable ranges corresponding to the plurality of types of arm covers are registered in the movable range determination unit in in advance, and one of the plurality of the second movable ranges is selected according to the first input.

2. The robot system according to claim 1, wherein
the input reception unit is realized by a personal computer and the first input is executed by a user.

3. The robot system according to claim 1, wherein
the arm has a sensor that senses attachment of the arm cover, and
the input reception unit receives a detection result of the sensor as the first input.

4. A robot system comprising:
a robot having an arm configured to which an arm cover for covering a wire or a pipe placed outside of the arm is attachable;
an input reception unit that receives first input indicating attachment of the arm cover to the arm;
a movable determination unit that determines a movable range of the robot to be a second movable range smaller than a first movable range without the attachment of the arm cover according to the first input; and
a robot control unit that controls an operation of the robot according to the second movable range, wherein
the input reception unit is configured to receive second input having an influence on the movable range of the robot in addition to the first input, and
the movable range determination unit determines the second movable range from the first input and the second input using a machine-learned determination model.

5. A control method for a robot configured to which an arm cover for covering a wire or a pipe placed outside of an arm is attachable, comprising:
(a) receiving first input indicating attachment of the arm cover to the arm;
(b) determining a movable range of the robot to be a second movable range smaller than a first movable range without the attachment of the arm cover according to the first input; and
(c) controlling an operation of the robot according to the second movable range, wherein
a plurality of types of arm covers are attachable as the arm cover,
the first input is input for a distinction of the attached arm cover among the plurality of types of arm covers, and
a plurality of the second movable ranges corresponding to the plurality of types of arm covers are registered in advance, and one of the plurality of the second movable ranges is selected in the (b) according to the first input.

* * * * *